United States Patent
Thoresen

(10) Patent No.: US 7,694,775 B2
(45) Date of Patent: Apr. 13, 2010

(54) POWER STEERING GEAR COOLING

(75) Inventor: Rolf Thoresen, Älvägen (SE)

(73) Assignee: Volvo Lastvagnar AB, Göteborg (SE)

( * ) Notice: Subject to any disclaimer, the term of this patent is extended or adjusted under 35 U.S.C. 154(b) by 203 days.

(21) Appl. No.: 11/721,450

(22) PCT Filed: Dec. 8, 2005

(86) PCT No.: PCT/SE2005/001089

§ 371 (c)(1),
(2), (4) Date: Jun. 12, 2007

(87) PCT Pub. No.: WO2006/078199

PCT Pub. Date: Jul. 27, 2006

(65) Prior Publication Data

US 2008/0023252 A1  Jan. 31, 2008

(30) Foreign Application Priority Data

Jan. 24, 2005  (SE) .................................... 0500197

(51) Int. Cl.
*B62D 5/00* (2006.01)

(52) U.S. Cl. ................... 180/403; 180/400; 180/417; 180/442

(58) Field of Classification Search ................ 180/400, 180/403, 442, 417, 432
See application file for complete search history.

(56) References Cited

U.S. PATENT DOCUMENTS

| 5,002,117 A | * | 3/1991 | Buckley et al. | ........... 165/44 |
|---|---|---|---|---|
| 5,101,885 A | * | 4/1992 | Drake | ........................ 165/47 |
| 5,810,110 A | | 9/1998 | Sheppard | |
| 5,839,398 A | * | 11/1998 | Hamilton | ................. 123/41.33 |
| 6,035,930 A | * | 3/2000 | Schwartz | ..................... 165/169 |
| 6,668,765 B2 | * | 12/2003 | Zlotek | ..................... 123/41.31 |
| 2003/0116104 A1 | * | 6/2003 | Zlotek | ..................... 123/41.31 |
| 2007/0080014 A1 | * | 4/2007 | Kamman | ..................... 180/417 |

FOREIGN PATENT DOCUMENTS

| EP | 1219526 A1 | 7/2002 |
|---|---|---|
| EP | 1746014 A | 1/2007 |

OTHER PUBLICATIONS

International Search Report for corresponding International Application PCT/SE2005/001859.
International Preliminary Report on Patentability for corresponding International Application PCT/SE2005/001859.
European Search Report for corresponding European App. 05 81 3454.

* cited by examiner

*Primary Examiner*—Glenn Dayoan
*Assistant Examiner*—Tashiana Adams
(74) *Attorney, Agent, or Firm*—WRB-IP LLP

(57) ABSTRACT

A power steering gear for a heavy vehicle includes a housing and a flow path for a power steering fluid. A heat exchanger is mounted to the housing or is a part thereof. The heat exchanger includes a first flow path for the power steering fluid and a second flow path for a coolant adapted to exchange heat with the power steering fluid. A cooling system for a power steering gear, a heavy vehicle comprising a power steering gear having such a cooling system, and a method of cooling the power steering fluid of a power steering gear on a heavy vehicle are also disclosed.

16 Claims, 3 Drawing Sheets

POWER STEERING GEAR COOLING

BACKGROUND AND SUMMARY

The present invention relates to power steering gears for motor vehicles and, more specifically, to cooling systems for such power steering gears.

Motor vehicles often employ power steering assist systems to reduce the amount of effort needed for steering the vehicle. Such a system generally employs a power steering pump that pumps a fluid, such as a hydraulic fluid, with a high pressure. The pumping pressure is used to assist the steering effort of the vehicle. The power steering pump generates heat when in use, which heats the fluid. This heat can reduce the lifetime of the steering gear due to higher wear and leakage on power steering gears. The steering gear is also often positioned close to the engine that also generates heat. On modern trucks, the engine is encapsulated in order to reduce noise, which in turn increases the temperature around the engine. In order to cool the steering gear oil, it is known to install a heat exchange system in the high pressure part of the system. Known systems for such cooling include air-cooled heat exchangers in which the pump fluid is cooled by air in a manner similar to the liquid cooling that takes place in a radiator for the engine coolant. However, such a cooling system is very dependent on the airflow that may be very limited at low or at idle speed. Furthermore the cooling effect may also be insufficient when the temperature of the surroundings is high. There is also a disadvantage in installing a heat exchanger in the high pressure part, as the installation is expensive due to the high pressure. A leakage in the high pressure part will also be more severe than in the low pressure part.

To increase the cooling rate, the systems may use the engine coolant from the engine. An example of such a system is known from US 2003116104A, in which a cooling jacket is provided about a periphery of the power steering pump housing for cooling the pump housing. This cooling jacket cools the steering pump, but is relatively large and increases the arrangement complexity.

EP 1219526 A and EP 968902 A shows hydraulic fluid reservoirs with an integrated heat exchanger for cooling the fluid. The heat exchanger is connected to the engine coolant.

U.S. Pat. No. 5,513,490 A and U.S. Pat. No. 5,718,281 A shows metallic hydraulic fluid reservoirs with integrated cooling fins for cooling the fluid. This solution is dependent on the surrounding air temperature.

U.S. Pat. No. 5,002,117 A shows a system where the return tube is much longer than necessary, creating a cooling circuit. This solution creates a high loss in the return line, which may require a larger pump to make up for the losses.

All the proposed solutions may work in some cases, bur they all displays different drawbacks, mainly by increasing the system weight, cost and arrangement complexity.

It is desirable to provide a compact cooling system for cooling of the power steering fluid in a motor vehicle. It is also desirable to provide a cooling system that can be used to modify already mounted power steering systems to provide cooling of the power steering fluid.

The present invention relates in a first aspect to a power steering gear for a heavy vehicle, said power steering gear comprising a housing, a flow path for a power steering fluid, and a heat exchanger mounted to said housing or being a part thereof, said heat exchanger comprising a first flow path for the power steering fluid and a second flow path for a coolant adapted to exchange heat with the power steering fluid.

Since the heat exchanger is a separate unit, it can either be integrated in the design of new power steering gears or used to modify operational systems already in use when a problem with insufficient cooling of the power steering fluid arises. The present invention thereby provides a relatively cheap and flexible solution. The option of mounting the cooling system to already mounted power steering systems furthermore renders it possible to adjust new vehicles to the customers' specific needs at the time of delivery.

The power steering gear comprises a high-pressure fluid inlet part receiving the power steering fluid from the pump and a low-pressure fluid outlet part returning the power steering fluid to a reservoir or the pump, and the heat exchanger may be mounted adjacent to or on to said inlet or outlet part. Preferably, the heat exchanger is mounted to the outlet part, thus cooling the fluid on the low-pressure side of the system.

Alternatively, the heat exchanger can be an integrated part of said inlet or outlet part such that when assembling the power steering gear, the outlet or inlet part comprises the heat exchanger which then provides an even more compact design of a power steering gear with cooling.

The heat exchanger preferably comprise a plate cooler with an inlet and outlet for the coolant, and the coolant may be water supplied to the heat exchanger by a specific pump for that purpose, but preferably the coolant is an engine coolant of an engine of the vehicle to which the power steering is mounted. Thus, the inlet and outlet of the heat exchanger is coupled directly to the coolant system of the engine of the vehicle, such that the coolant is cooled by the engine radiator.

The cooling system may further comprise air-cooling means for providing an even better cooling of the power steering fluid.

According to a second aspect, the invention relates to a cooling system for a power steering gear, said system comprising a heat exchanger adapted to be mounted to the housing of a power steering gear or being a part thereof and comprising a flow path for a coolant adapted to exchange heat with the power steering fluid.

The heat exchanger may be adapted to be mounted to an already operational power steering gear, or it can be an integrated part of the power steering gear.

The heat exchanger may comprise means for mounting it adjacent to or on to a power steering fluid inlet or outlet of a power steering gear. The heat exchanger may comprise an adapter plate allowing mounting of the heat exchanger to different kinds of power steering gears having different inlet or outlet pipe stub or other parts protruding from its housing. Thus, the same type of heat exchanger can be mounted to different kinds of power steering gear by means of the adapter plate.

The heat exchanger preferably comprises a plate cooler with an inlet and outlet for the coolant, and as mentioned above, it preferably uses an engine coolant from an engine of a vehicle to which the power steering gear is mounted.

The cooling system may further comprise air-cooling means for providing an even better cooling of the power steering fluid.

According to a third aspect, the present invention relates to a heavy vehicle comprising a power steering gear according to the first aspect and comprising a cooling system according to the third aspect.

According to a fourth aspect, the present invention relates to a method of cooling the power steering fluid of a power steering gear on a heavy vehicle, the method comprising the steps of:

provide a heat exchanger on to a power fluid inlet or outlet of the power steering gear, pumping a coolant through the heat exchanger for exchanging heat with the power fluid so as to cool the power fluid.

The step of pumping is preferably provided by a coolant pump of the engine of the vehicle, said coolant being cooled by the engine radiator.

It is an advantage of the use of a cooling system in which the pump fluid is cooled by the engine coolant that it is possible to increase the pump flow without risking to overheat the system. Such an increase in the flow may e.g. be advantageous at idle speed. It is a further advantage of the present invention that it can be employed without any need to change the present system and pump design. It is a further advantage of the present invention that the power steering fluid may be led through the heat exchanger via e.g. pipes having relatively small wall thickness. This makes the cooling more efficient than when the system is based on cooling of other parts of the pumps, such as the whole pump housing.

BRIEF DESCRIPTION OF THE FIGURES

In the following, preferred embodiments of the present invention will be described with reference to the accompanying figures in which.

DETAILED DESCRIPTION

Figure 1:
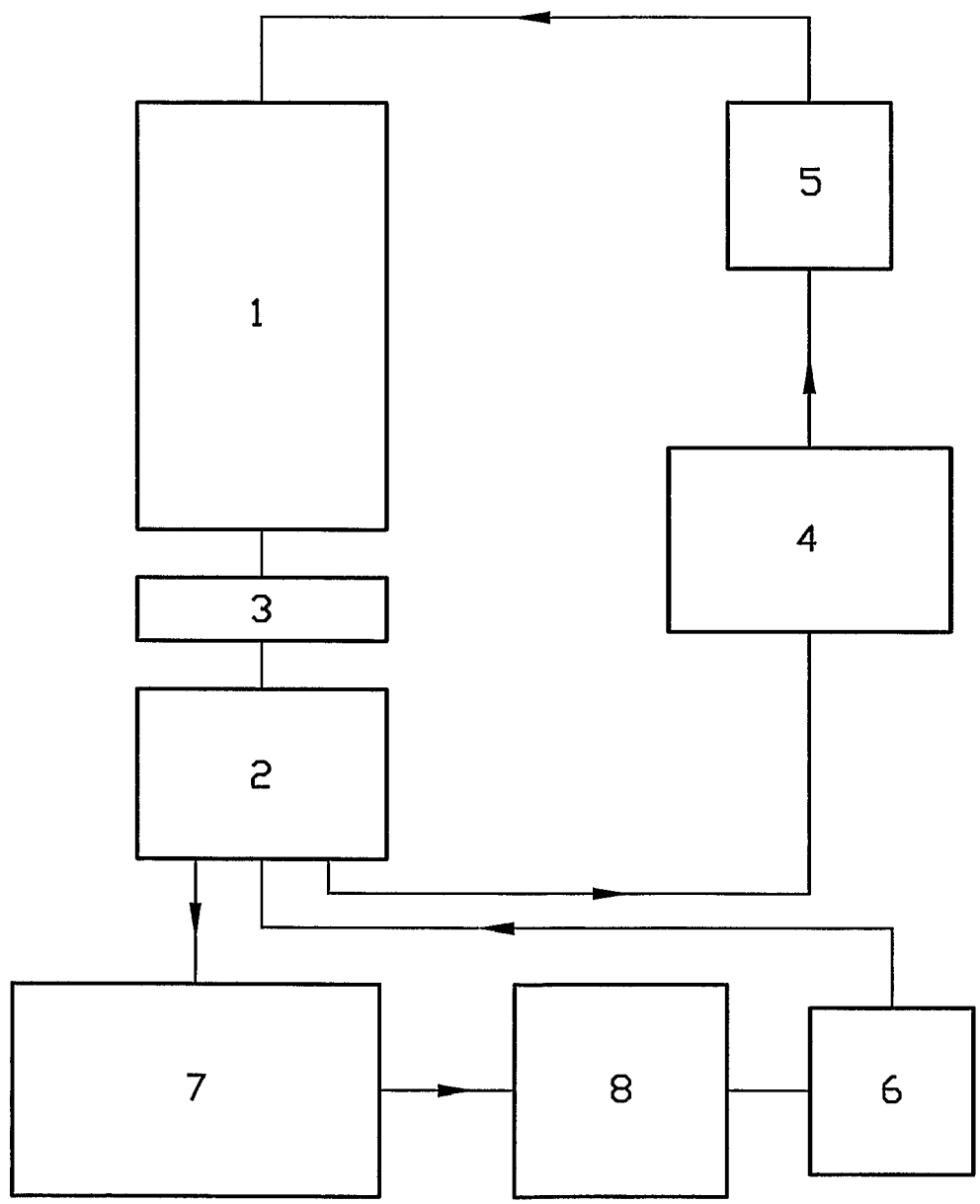
FIG. 1 is a schematic view of a preferred embodiment of the cooling system according to the invention applied on a vehicle.

FIG. 1 shows schematically a preferred design of a cooling system in which the engine coolant is used to cool also the power steering fluid. The power steering gear 1 is used to reduce the amount of effort needed for steering the vehicle. A heat exchanger 2 is mounted to the power steering gear via an adapter plate 3. The pump 5 builds up a high pressure in the power steering fluid, which enters the power steering gear 1. The pressure of the steering fluid is reduced in the power steering gear, so that the steering fluid is at a low pressure when leaving the steering gear and entering the heat exchanger. From the heat exchanger the steering fluid flows to a fluid reservoir 4.

In the preferred embodiment shown, the cooling system uses the engine coolant to cool the power steering fluid for the power steering gear system. A coolant fluid pump 6 on the engine is used to circulate the coolant from the engine 7 via the engine radiator 8 through the heat exchanger 2 for the power steering pump fluid. The heat exchanger comprises a first flow path for the power steering pump fluid and a second flow path for the coolant.

In another embodiment, the fluid used to cool the power steering fluid is not the engine coolant but a fluid specifically used for this purpose. In this case a separate cooling system with pump and radiator may be applied.

Figure 2:
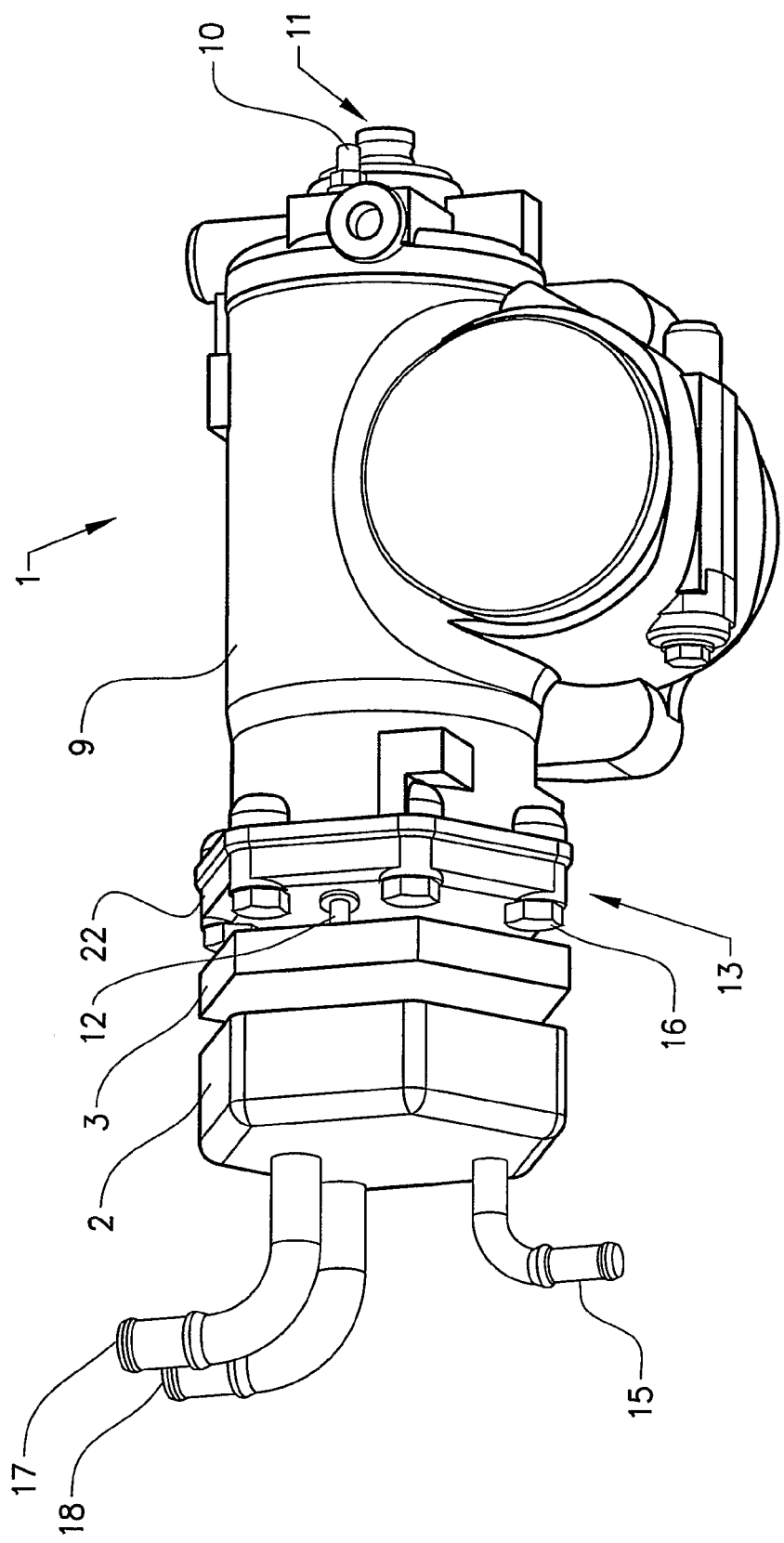
FIG. 2 shows a cooling system in which the heat exchanger is mounted to the housing of a power steering gear via an intermediate adapter plate.

FIG. 2 shows a power steering gear 1, wherein a heat exchanger 2 is mounted onto the housing 9 thereof via an intermediate adapter plate 3. The power steering system is operational on it's own, i.e. without the cooling system, which will be appropriate when the system is used in conditions where cooling of the pump fluid is unnecessary. The power steering fluid, at high pressure, enters the power steering gear 1 through an inlet 10 at a first section 11 and leaves the power steering gear 1 through an outlet (12) at a second section 13. In the embodiment shown, the heat exchanger 2 is mounted at the second section 13, but in another embodiment of the invention it may be mounted in a similar way at the first section 11. Depending on the location of the inlet and/or outlet, the heat exchanger may also be mounted on the side of the housing. The heat exchanger 2 comprises connecting means (not shown) for connecting the power steering gear outlet via the adapter plate 3 to the inlet (not shown) of the first flow path of the heat exchanger 2. The first flow path of the heat exchanger 2 comprises a return pipe 15 through which the power steering fluid is returned to the fluid reservoir 4 of FIG. 1.

The adapter plate 3 enables mounting of the cooling system on a power steering gear having an outlet pipe stub (12), bolts 16 or other parts protruding from a plane surface. This embodiment allows for an easy modification of the power steering gear system, as no further modifications of the power steering gear itself are necessary. The specific design of the adapter plate 3 may be varied to enable firm mounting on different power steering gear designs.

In another preferred embodiment of the invention the heat exchanger 3 is mounted directly on to the housing 9 of a power steering gear 1 without the use of an adapter plate, which embodiment ensures a more compact solution. This integration of the adapter plate into the heat exchanger may be advantageous, e.g. when only one type of power steering gear is used. It may hereby be possible to design the cooling system as an integrated part of the power steering gear, for example by integrating the cooling in the bottom plate 22 of the power steering gear.

The mounting of the heat exchanger, with or without the adapter plate, can be done in several ways. One way is to remove some or all of the bolts 16 that attach the bottom plate 22 to the housing and to replace them with bolts (not shown) that attach the heat exchanger together with the bottom plate to the housing. Another way is to remove the bottom plate and to replace it with the heat exchanger, using the same bolt-holes. The heat exchanger can also be clamped to the housing, e.g. by clamping it to the rim of the bottom plate.

In a preferred embodiment of the invention, the coolant fluid enters the second flow path in the heat exchanger 2 through an input pipe stub 17 and leaves the heat exchanger 2 through a return pipe stub 18. The coolant fluid may be the engine coolant or another fluid used only for the cooling of the power steering pump fluid.

Figure 3:
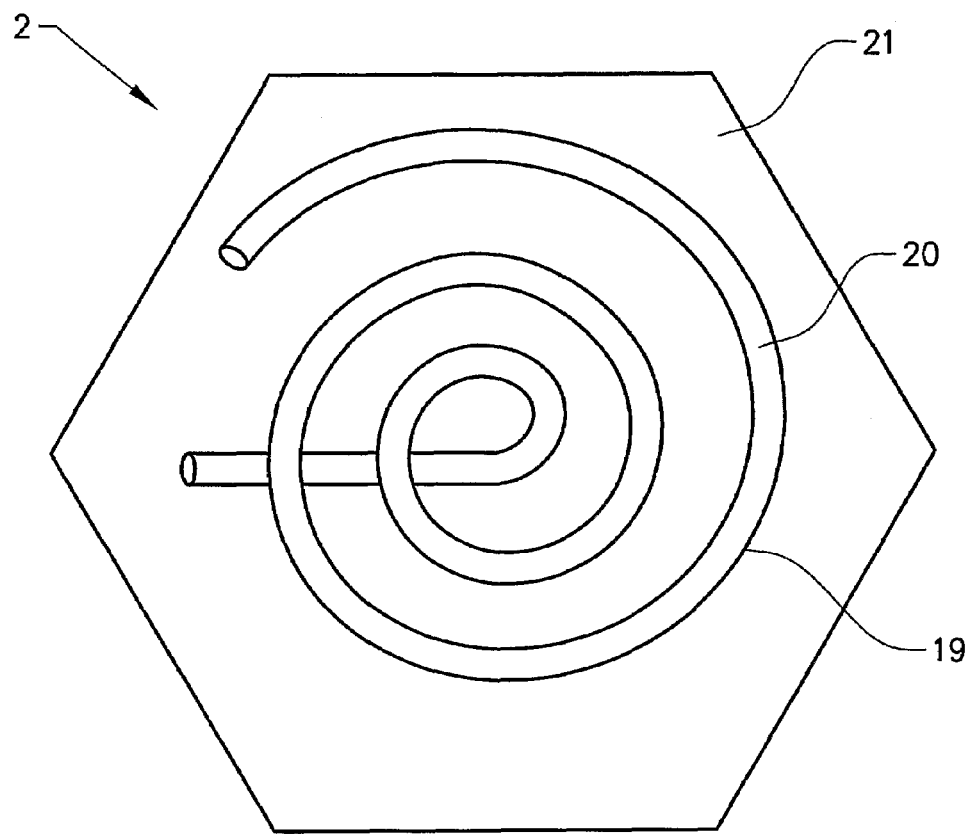
FIG. 3 shows an embodiment of the inside of a heat exchanger according to the invention.

FIG. 3 shows an embodiment of the inside of a heat exchanger 2 in which the coolant fluid flows in a partly helical pipe 19, defining a first flow path 20. The inside of the heat exchanger forms a chamber 21, defining a second flow path, through which the pump fluid passes. The two fluids are separated only by the walls of the helical pipe, which results in a heat exchange and thereby a cooling effect. The outer geometry of the heat exchanger may vary from the one shown in the figure. Furthermore, the specific design of the two flow paths may vary from the one described. E.g. the pump fluid may flow in a helical pipe following the shape of the flow path containing the coolant fluid.

It will be possible to increase the cooling of the pump fluid if the cooling system further comprises air-cooling. Such air-cooling may e.g. be provided by letting the pipe, in which the pump fluid runs, pass through a conventional air-cooling system.

It should be understood that numerous modifications and changes of the embodiments described above may be made within the scope of the appended claims.

The invention claimed is:

1. A power steering gear comprising a housing, a flow path for a power steering fluid and a heat exchanger that is at least one of mounted to and forms a part of housing, the power steering gear also comprising a high-pressure fluid inlet and a low-pressure fluid outlet, wherein the heat exchanger is mounted adjacent to the outlet, the heat exchanger comprising a first flow path for the power steering fluid which is connected to the outlet, and a second flow path for a coolant adapted to exchange heat with the power steering fluid so as to cool the power steering fluid, wherein the heat exchanger comprises a plate cooler with an inlet and an outlet for the coolant.

2. A power steering gear according to claim 1, wherein the coolant is an engine coolant of an engine of a vehicle comprising the power steering.

3. A power steering gear according to claim 1, wherein the cooling system further comprises air-cooling means for cooling the power steering fluid.

4. A cooling system for a power steering gear, the system comprising a heat exchanger adapted to at least one of be mounted to a housing of the power steering gear and form a part thereof, a first flow path for power steering fluid which is connected to an outlet of the power steering gear and a second flow path for a coolant adapted to exchange heat with the power steering fluid, wherein the heat exchanger comprises a plate cooler with an inlet and outlet for the coolant.

5. A cooling system according to claim 4, wherein the heat exchanger is an integrated part of the power steering gear.

6. A cooling system according to claim 4, wherein the heat exchanger comprises means for mounting it onto a power steering fluid outlet of a power steering gear.

7. A cooling system for a power steering gear, the system comprising a heat exchanger adapted to at least one of be mounted to a housing of the power steering gear and form a part thereof, a first flow path for power steering fluid which is connected to an outlet of the power steering gear and a second flow path for a coolant adapted to exchange heat with the power steering fluid, further comprising an adapter plate allowing mounting of the heat exchanger to different kinds of power steering gears having parts protruding from a power steering gear housing.

8. A cooling system according to claim 4, wherein the cooling system is adapted to use an engine coolant from an engine of a vehicle to which the power steering gear is mounted.

9. A cooling system according to claim 4, wherein the cooling system further comprises air-cooling means for cooling the power steering fluid.

10. A heavy vehicle comprising a power steering gear according to claim 1.

11. A vehicle according to claim 10, further comprising a cooling system for a power steering gear, the system comprising a heat exchanger adapted to at least one of be mounted to a housing of the power steering gear and form a part thereof, a first flow path for power steering fluid which is connected to an outlet of the power steering gear and a second flow path for a coolant adapted to exchange heat with the power steering fluid, wherein the heat exchanger comprises a plate cooler with an inlet and outlet for coolant.

12. A cooling system according to claim 7, wherein the heat exchanger is an integrated part of the power steering gear.

13. A cooling system according to claim 7, wherein the heat exchanger comprises means for mounting it onto a power steering fluid outlet of a power steering gear.

14. A cooling system according to claim 7, wherein the cooling system is adapted to use an engine coolant from an engine of a vehicle to which the power steering gear is mounted.

15. A cooling system according to claim 9, wherein the cooling system further comprises air-cooling means for cooling the power steering fluid.

16. A vehicle according to claim 10, further comprising a cooling system for a power steering gear, the system comprising a heat exchanger adapted to at least one of be mounted to a housing of the power steering gear and form a part thereof, a first flow path for power steering fluid which is connected to an outlet of the power steering gear and a second flow path for a coolant adapted to exchange heat with the power steering fluid, further comprising an adapter plate allowing mounting of the heat exchanger to different kinds of power steering gears having parts protruding from a power steering gear housing.

* * * * *